United States Patent
Barron

(10) Patent No.: US 7,226,056 B2
(45) Date of Patent: Jun. 5, 2007

(54) ELECTRO-MAGNETIC VEHICLE ROLL CONTROL SYSTEM

(75) Inventor: Richard J. Barron, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 418 days.

(21) Appl. No.: 10/884,431

(22) Filed: Jul. 2, 2004

(65) Prior Publication Data

US 2005/0179219 A1   Aug. 18, 2005

Related U.S. Application Data

(60) Provisional application No. 60/488,125, filed on Jul. 16, 2003.

(51) Int. Cl.
*B60G 21/00* (2006.01)

(52) U.S. Cl. ............... 280/5.511; 280/124.106; 188/266.1

(58) Field of Classification Search ............ 280/5.511, 280/124.106–124.107, 5.506–5.508, 5.502; 267/156, 157, 206, 195; 188/299.1, 266.1–266.3, 188/322.22

See application file for complete search history.

(56) References Cited

U.S. PATENT DOCUMENTS

| | | | |
|---|---|---|---|
| 3,752,497 A | 8/1973 | Enke et al. | |
| 3,820,812 A | 6/1974 | Stubbs et al. | |
| 3,868,910 A | 3/1975 | Schultz | |
| 3,868,911 A | 3/1975 | Schultz | |
| 3,871,635 A | 3/1975 | Unruh et al. | |
| 3,885,809 A | 5/1975 | Pitcher | |
| 3,953,040 A | 4/1976 | Unruh et al. | |
| 4,206,935 A | 6/1980 | Sheppard et al. | |
| 4,345,661 A | 8/1982 | Nishikawa | |
| 4,589,678 A | 5/1986 | Lund | |
| 4,624,476 A | 11/1986 | Tanaka et al. | |
| 4,669,749 A | 6/1987 | Tanaka et al. | |
| 4,693,493 A | 9/1987 | Ikemoto et al. | |
| 4,697,237 A | 9/1987 | Tanaka et al. | |
| 4,730,843 A | 3/1988 | Tanaka et al. | |
| 4,765,649 A | 8/1988 | Ikemoto et al. | |
| 4,877,226 A * | 10/1989 | Taylor | 267/196 |
| 4,903,982 A | 2/1990 | Harara et al. | |
| 4,937,748 A | 6/1990 | Yonekawa et al. | |
| 4,966,390 A | 10/1990 | Lund et al. | |
| 4,974,875 A | 12/1990 | Sugasawa et al. | |
| 5,015,009 A | 5/1991 | Ohyama et al. | |
| 5,020,826 A | 6/1991 | Stecklein et al. | |
| 5,040,823 A | 8/1991 | Lund | |
| 5,066,041 A | 11/1991 | Kindermann et al. | |
| 5,106,120 A | 4/1992 | Di Maria | |
| 5,116,069 A | 5/1992 | Miller | |

(Continued)

FOREIGN PATENT DOCUMENTS

DE    10126928 A1    12/2002

(Continued)

*Primary Examiner*—Paul N. Dickson
*Assistant Examiner*—Drew J. Brown
(74) *Attorney, Agent, or Firm*—MacMillan, Sobanski & Todd, LLC

(57) ABSTRACT

A system is disclosed for controlling the roll of a motor vehicle. The system comprises a selective lock connected between an unsprung portion of the vehicle and a sprung portion of the vehicle.

22 Claims, 16 Drawing Sheets

U.S. PATENT DOCUMENTS

| | | |
|---|---|---|
| 5,149,131 A | 9/1992 | Sugasawa et al. |
| 5,161,822 A | 11/1992 | Lund |
| 5,177,681 A | 1/1993 | Sato |
| 5,178,406 A | 1/1993 | Reynolds |
| 5,195,772 A | 3/1993 | Bachrach et al. |
| 5,219,181 A | 6/1993 | Lund |
| 5,230,529 A | 7/1993 | Harvey-Bailey |
| 5,251,134 A | 10/1993 | Takehara et al. |
| 5,251,136 A | 10/1993 | Fukuyama et al. |
| 5,251,926 A | 10/1993 | Aulerich et al. |
| 5,253,174 A | 10/1993 | Inagaki et al. |
| 5,362,094 A | 11/1994 | Jensen |
| 5,417,407 A * | 5/1995 | Gordon ............. 267/154 |
| 5,443,283 A | 8/1995 | Hawkins et al. |
| 5,447,332 A | 9/1995 | Heyring |
| 5,529,324 A | 6/1996 | Krawczyk et al. |
| 5,597,180 A | 1/1997 | Ganzel |
| 5,630,623 A | 5/1997 | Ganzel |
| 6,293,377 B1 * | 9/2001 | Okada et al. ............. 188/282.2 |
| 7,029,014 B2 * | 4/2006 | Hamm .................... 280/5.502 |
| 2003/0122342 A1 | 7/2003 | Germano et al. |
| 2004/0084857 A1 | 5/2004 | Vortmeyer et al. |

FOREIGN PATENT DOCUMENTS

| | | |
|---|---|---|
| GB | 2377415 A | 1/2003 |

\* cited by examiner

ELECTRO-MAGNETIC VEHICLE ROLL CONTROL SYSTEM

CROSS-REFERENCE TO RELATED APPLICATIONS

This application claims the benefit of United States Provisional Application No. 60/488,125, filed Jul. 16, 2003, the disclosures of which are incorporated herein by reference.

BACKGROUND OF THE INVENTION

This invention relates in general to motor vehicle roll control systems.

Suspension systems for motor vehicles are known which isolate the vehicle load from irregularities in the terrain over which the vehicle travels. A semi-active suspension system, for example, normally includes a spring and a damper connected between the sprung and unsprung portions of the vehicle. Semi-active suspension systems are generally self-contained, and only react to the loads applied to them. In active suspension systems, by contrast, the reactions to the applied loads are positively supplied by electronically controlled hydraulic or pneumatic anti-roll lock mechanisms.

In addition to isolating the sprung portion of the vehicle from the road, it is desirable to stabilize the tendency of the sprung portion of the vehicle to tilt or roll relative to its unsprung portion when accelerating, decelerating or cornering at relatively high rates. Therefore, suspension systems have been proposed that attempt to maintain the vehicle in an essentially level position, regardless of the source of the force seeking to upset that position. For example, U.S. Pat. No. 4,206,935 to Sheppard et al., the disclosures of which are incorporated herein by reference, discloses a motor vehicle roll control system that includes anti-roll force adjustment means whereby the action of anti-roll bars can be modified within predetermined limits. Also, for example, U.S. Pat. No. 5,630,623 to Ganzel, the disclosures of which are incorporated herein by reference, discloses a semi-active system for controlling the roll of a motor vehicle including an anti-roll lock mechanism connected between an unsprung portion of the vehicle and a sprung portion of the vehicle, first and second pressure control valves, and first and second check valves.

Conventional anti-roll bars act to limit sway or roll of the vehicle to improve performance and improve comfort when cornering. Conventional anti-roll bars are permanently connected between sprung and unsprung parts of the vehicle and thus are always operational, which causes the vehicle to generally have a firmer ride than may be desirable for greatest comfort when traveling straight. Vehicles without anti-roll bars, conversely, may be comfortable when traveling relatively straight, but may be uncomfortable due to excessive roll during cornering.

SUMMARY OF THE INVENTION

The present invention is a system for controlling the roll of a motor vehicle. The system comprises a selective lock connected between an unsprung portion of the vehicle and a sprung portion of the vehicle. Preferably, a sprung portion of the vehicle is and end of a roll (anti-sway) bar of the vehicle.

One aspect of the present invention relates to a roll control system of the type described above which allows the vehicle suspension members to ratchet to their preferred positions when an unexpected load is imposed on them when the roll control system is locking.

Another aspect of the present invention relates to an embodiment of a roll control system of the type described above that has separate front and rear roll control circuits.

Various aspects and advantages of this invention will become apparent to those skilled in the art from the following detailed description of the preferred embodiment, when read in light of the accompanying drawings.

DETAILED DESCRIPTION OF THE PREFERRED EMBODIMENT

With reference to the drawings, the preferred embodiments of the present invention will be described.

Figure 1:
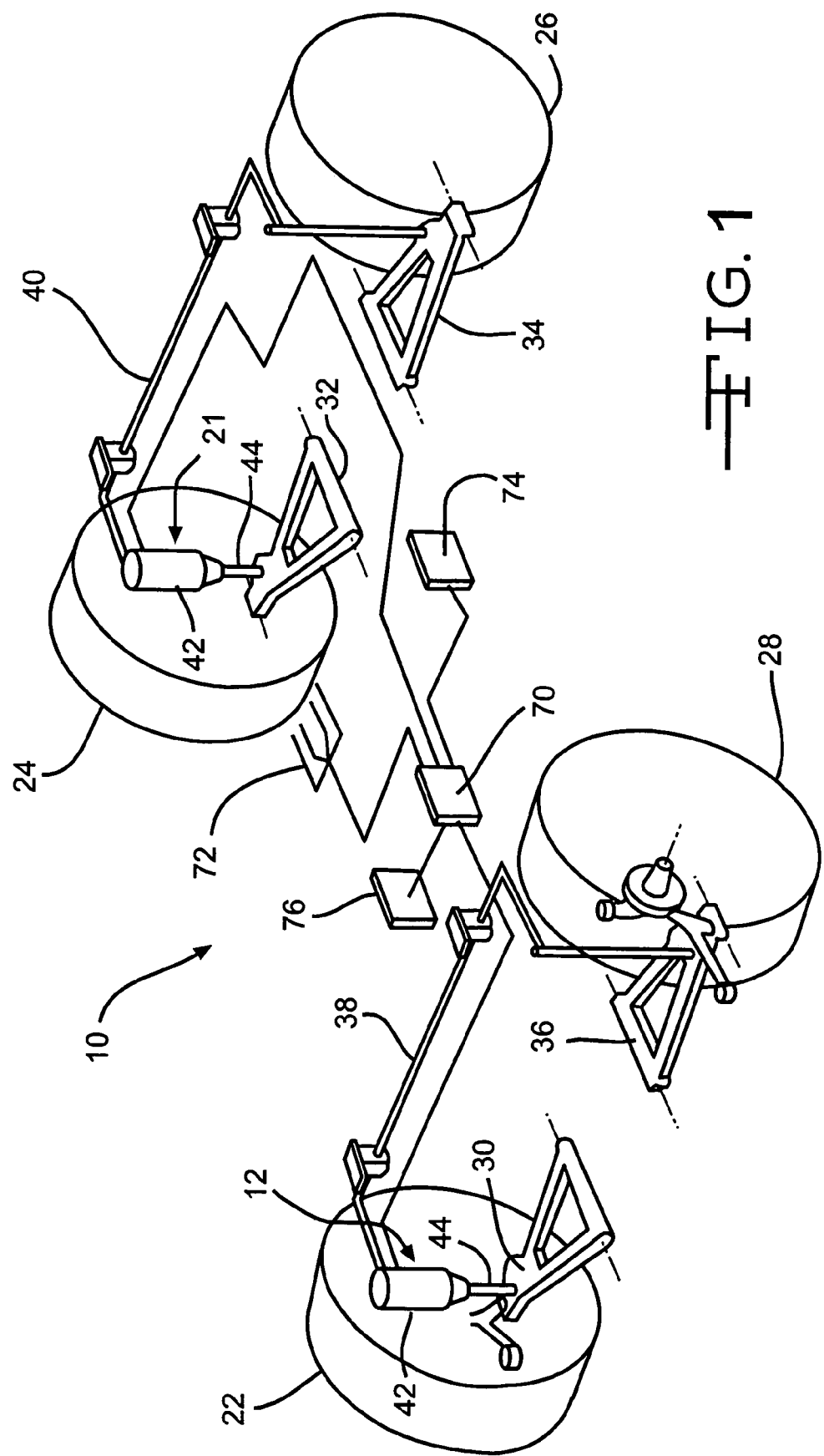
FIG. 1 is a schematic view of a system according to the present invention for controlling the roll of a motor vehicle.
Figure 2:
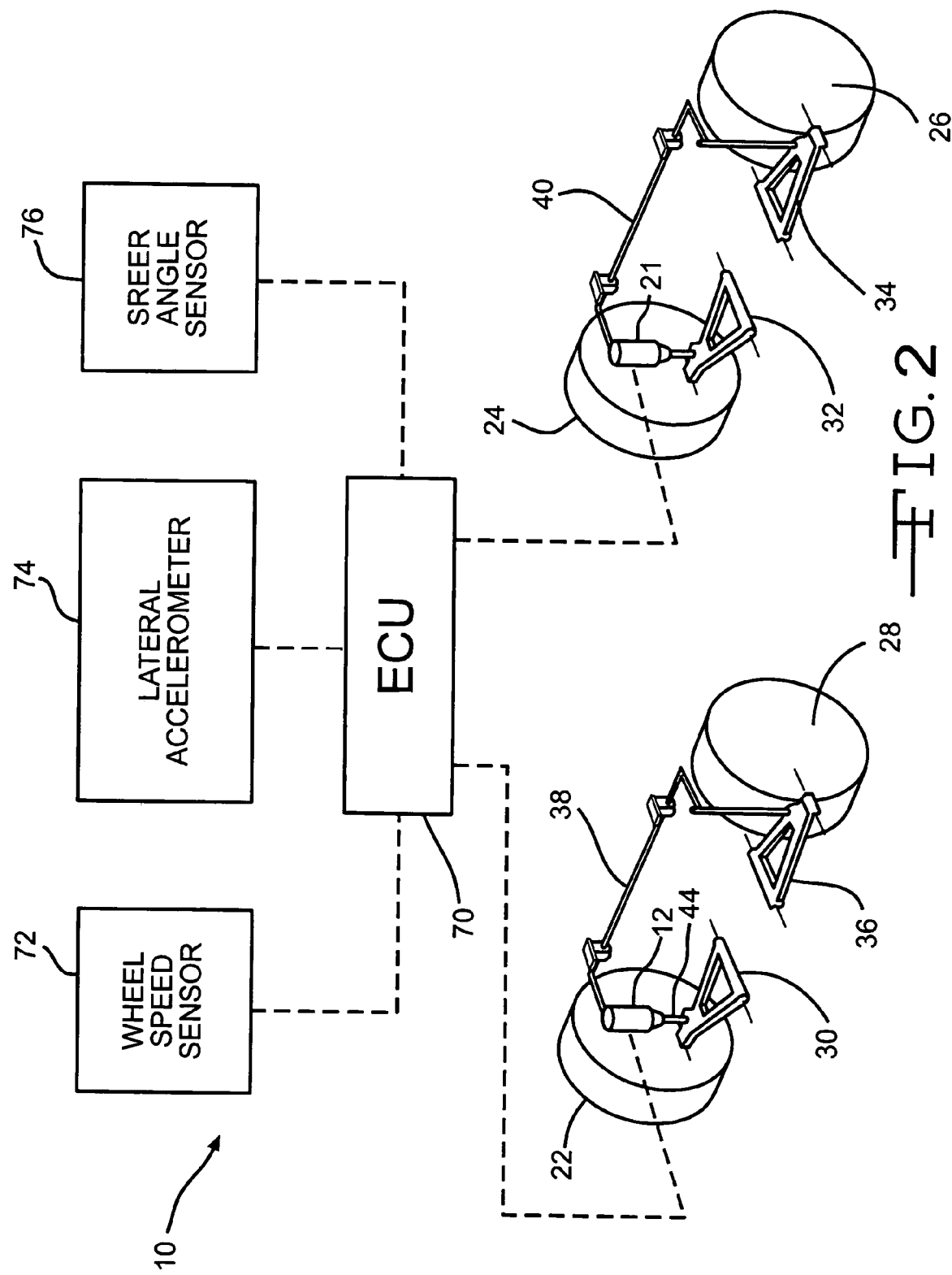
FIG. 2 is another schematic view of the roll control system shown in FIG. 1.

FIGS. 1 and 2 show a system 10 according to the present invention for controlling the roll of a motor vehicle. The system 10 comprises an anti-roll lock mechanism 12. In the embodiment shown in FIGS. 1 and 2, a second, rear anti-roll lock mechanism 21 is also provided.

Each of the wheels 22, 24, 26 and 28 of the vehicle is rotationally mounted about a substantially horizontal axis to a member such as suspension arms 30, 32, 34 and 36, respectively, which form part of an unsprung portion of the vehicle. The unsprung portion of the vehicle is in turn connected to a sprung portion of the vehicle through the anti-roll lock mechanisms 12 and 21 and anti-roll or anti-sway bars 38 and 40. Each of the anti-roll lock mechanisms 12 and 21 includes a casing 42 and an input rod 44 reciprocably disposed in the casing.

The following description will describe the structure and operation of the lock mechanism 12 the associated roll bar 38 and the associated suspension arms 30 and 36. Unless specifically stated otherwise the structure and operation of the lock mechanism 21, the associated roll bar 40 and the associated suspension arms 32 and 34 will be similar.

One of the casing 42 and the input rod 44 of the anti-roll lock mechanism 12 is drivingly connected to the associated anti-roll bar 38. The other of the casing 42 and the input rod 44 is drivingly connected to the suspension arm 30. In the embodiment shown in FIGS. 1 and 2, for example, the casing 42 of the front anti-roll lock mechanism 12 is connected to one free end of the front anti-roll bar 38, while the portion of the input rod 44 extending generally downwardly from the casing 42 is connected to the front right suspension arm 30. Similarly, the rear anti-roll bar 40 is coupled to the casing 42 of the right rear anti-roll lock mechanism 21 while the input rod 44 of the anti-roll lock mechanism 21 is connected to the suspension arm 32.

An electronic control unit (ECU) 70 is provided to process inputs from one or more wheel speed sensors 72, a lateral accelerometer sensor (accelerometer) 74, and a steering angle sensor 76.

In operation, the ECU 70 receives signals from the one or more wheel speed sensors 72, the lateral accelerometer sensor (accelerometer) 74, and the steering angle sensor 76 and controls each of the anti-roll lock mechanisms 12 and 21 as is described below. When the vehicle is traveling straight with little roll being introduced into the vehicle, the ECU 70 can unlock the anti-roll lock mechanism 12. When the anti-roll lock mechanism 12 is unlocked, the input rod 44 can move relative to the casing 42, thus permitting the associated free end of the anti-roll bar 38 to move freely relative to the suspension arm 30. This gives the vehicle a more comfortable ride when traveling relatively straight, similar to a vehicle without any anti-roll bar.

However, as discussed above, when the vehicle is not traveling straight it is generally desirable to counter the roll of the vehicle for improved comfort and performance. The motor vehicle may begin a relatively high speed left hand turn, for example, which in absence of compensation by the system 10 would cause the unsprung portion of the vehicle to tend to roll generally clockwise about the longitudinal axis of the vehicle, helping urge the occupants of the vehicle to the outside of the turn (sliding downhill).

At the beginning of such a maneuver, the sensors 72, 74 and 76 of the present invention signal the instantaneous conditions to the ECU 70. The ECU 70 in turn locks each of the anti-roll lock mechanisms 12 and 21. This permits the anti-roll bars 38 and 40 to act to counteract the roll of the vehicle in a manner similar to conventional anti-roll bars.

To counteract anticipated vehicle roll in the opposite direction, for example as might be experienced during a right hand turn, the ECU 70 repeats this procedure and locks each of the anti-roll lock mechanisms 12 and 21. In either case, as the sensors 72, 74 and 76 indicate an instantaneous or anticipated reduction or increase in the need for stability to deter vehicle roll, the ECU locks, unlocks or maintains the state of each of the anti-roll lock mechanisms 12 and 21 as appropriate.

Figure 3:
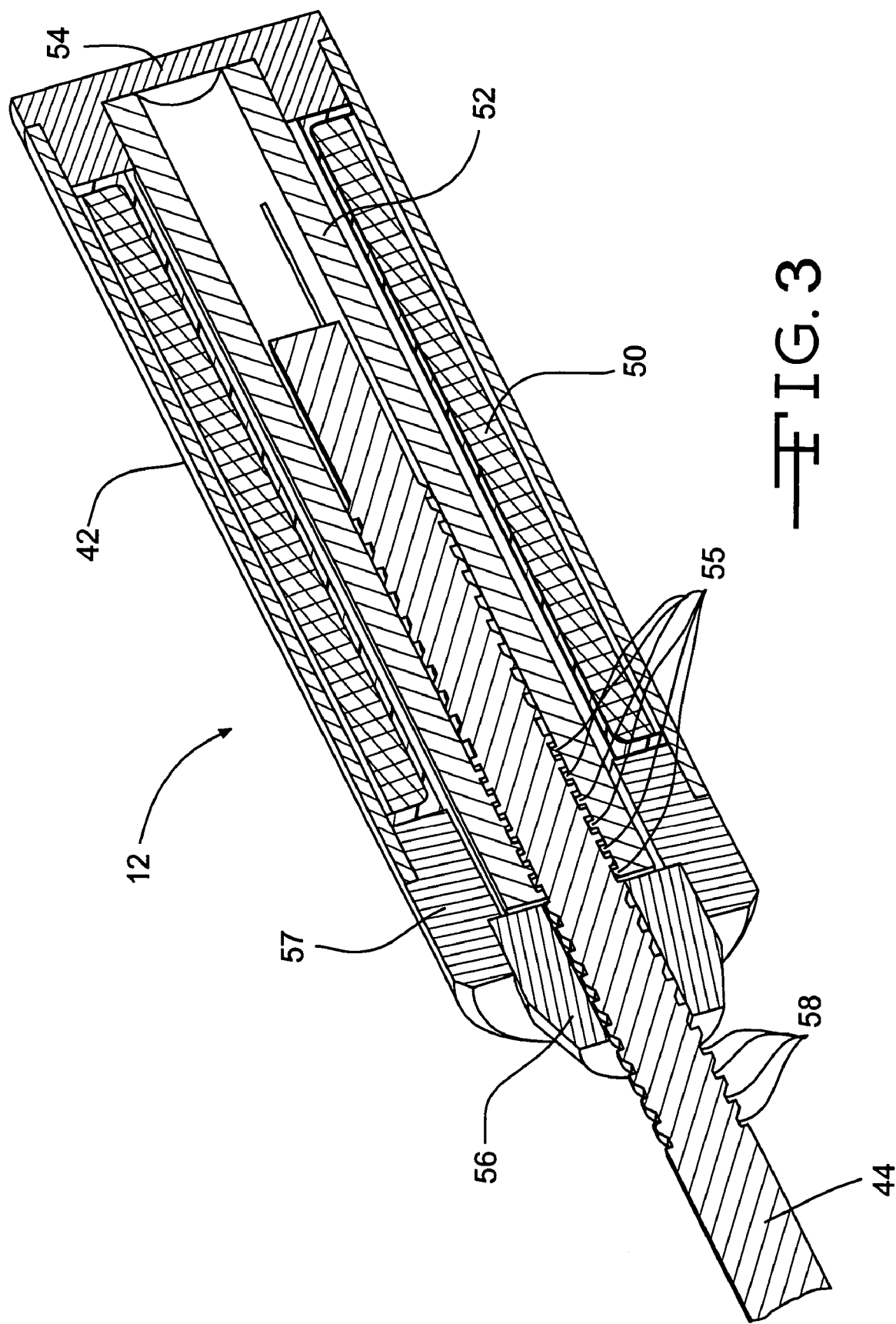
FIG. 3 is a cross-sectional perspective view of the anti-roll lock mechanism of the system of FIG. 1.
Figure 4:
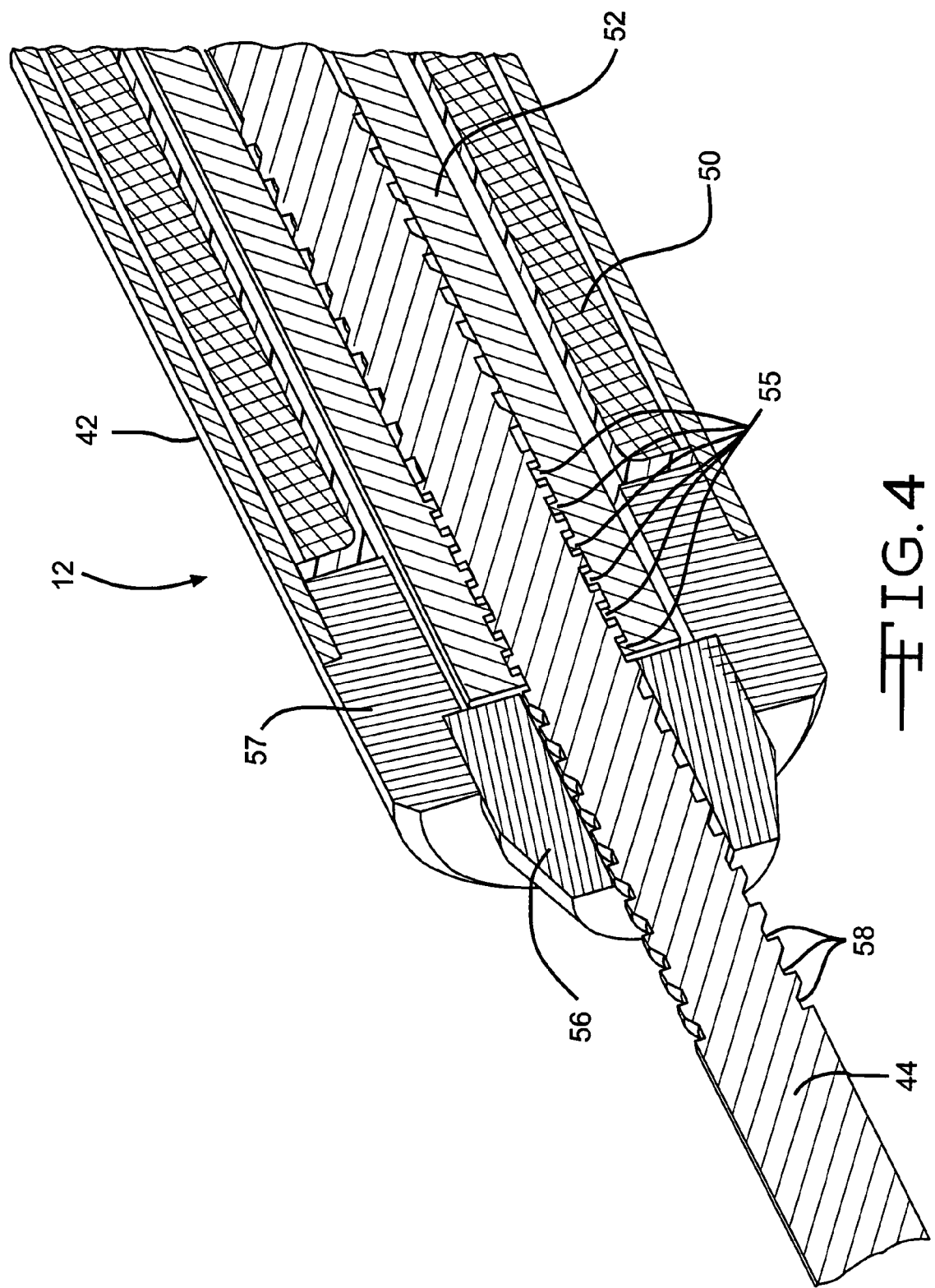
FIG. 4 is an enlarged view of a section of FIG. 3.

FIGS. 3 and 4 illustrate a preferred embodiment of the anti-roll lock mechanism 12 of the system of FIGS. 1 and 2. The generally cylindrical casing 42 surrounds a collet engagement mechanism, such as an electrical coil 50. A collet 52, which will be described below, is disposed within the coil 50 and is anchored to the casing 42 by a closed end cap 54. A rod guide 56 is anchored to the casing 42 by an open end cap 57 opposite the closed end cap 54. The input rod 44 is partially disposed inside the collet 52 and extends through the rod guide 56. A plurality of annular threads or grooves 58, the purpose of which will be described below, are formed in the exterior of the input rod 44.

The anti-roll lock mechanism 12 is shown in the locked state. In this locked state, the plurality of spaced apart ribs or flanges 55 on the collet fingers 62 engage the grooves 58 on the input rod 44 to lock the input rod 44 in a position relative to the collet 52, and thus relative to the casing 42 except allowing movement as will be described below.

Figure 5:
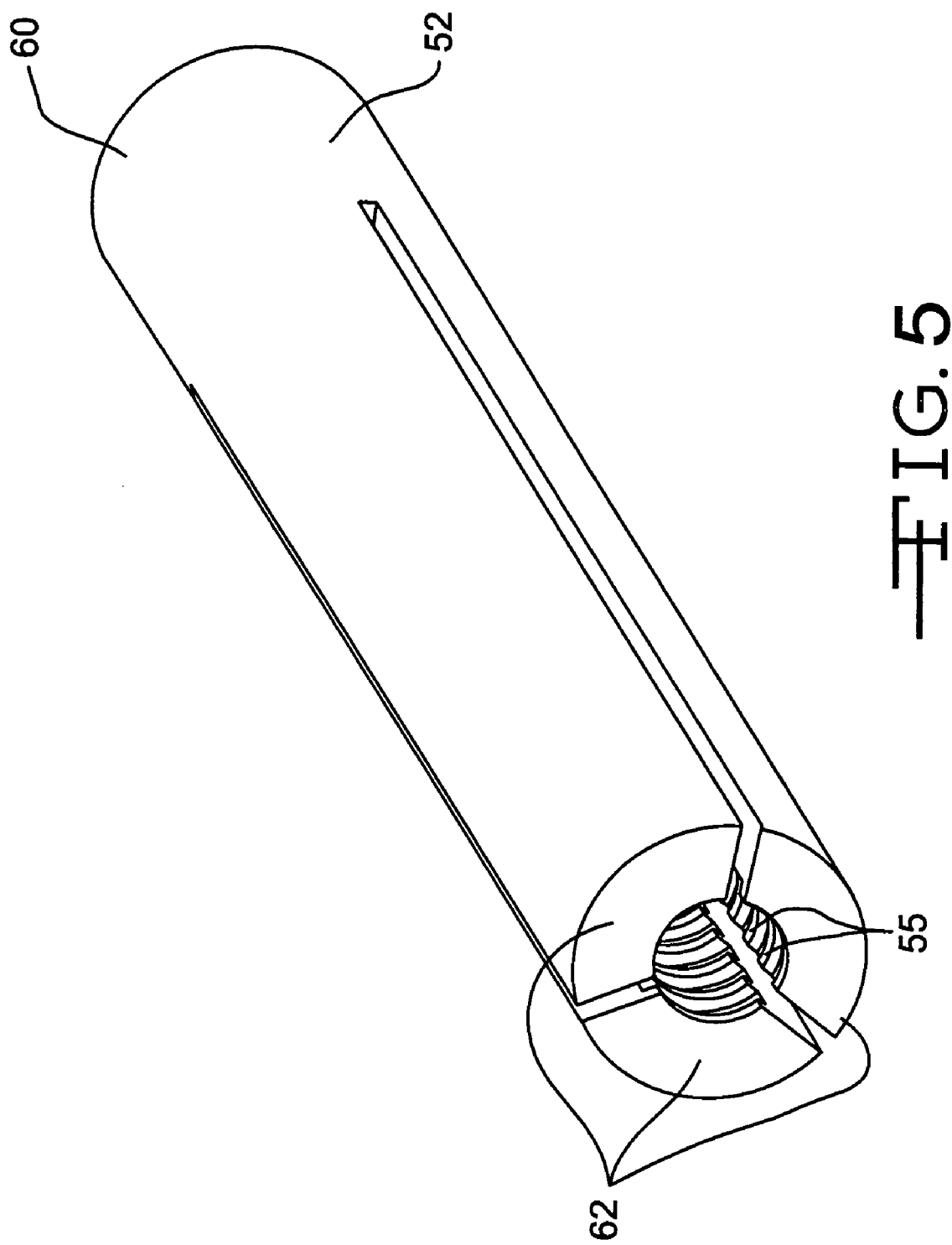
FIG. 5 is a perspective view of the collet of the of the anti-roll lock mechanism of FIG. 3.

FIG. 5 best illustrates the collet 52. The collet 52 includes a hollow cylindrical base portion 60 and a plurality of collet fingers 62. The collet fingers 62 extend longitudinally from circumferentially spaced apart locations of the base portion 60. A plurality of radially inwardly extending, longitudinally spaced apart flanges 55 are formed on the interior surface of each of the collet fingers 62 at an end of each of the collet fingers 62 opposite the base portion 60.

In a preferred embodiment, the collet fingers 62 are actuated by the magnetic field generated when the coil 50 is actuated, flexing the collet fingers 62 inwardly to engage the grooves 58 on the input rod 44. Thus, without electrical power, the lock mechanism 12 is normally unlocked. It is anticipated that such an arrangement may be desirable to conserve electrical energy, as a vehicle traveling mostly in straight lines along smooth roads will normally want the lock mechanism 12 unlocked for smoothest ride. Note that the collet fingers 62 may be actuated in any suitable manner. For example, the collet fingers 62 may be positioned by hydraulic or pneumatic actuators, or by bimetallic, piezo-electric, or phase-change actuators.

Figure 6:
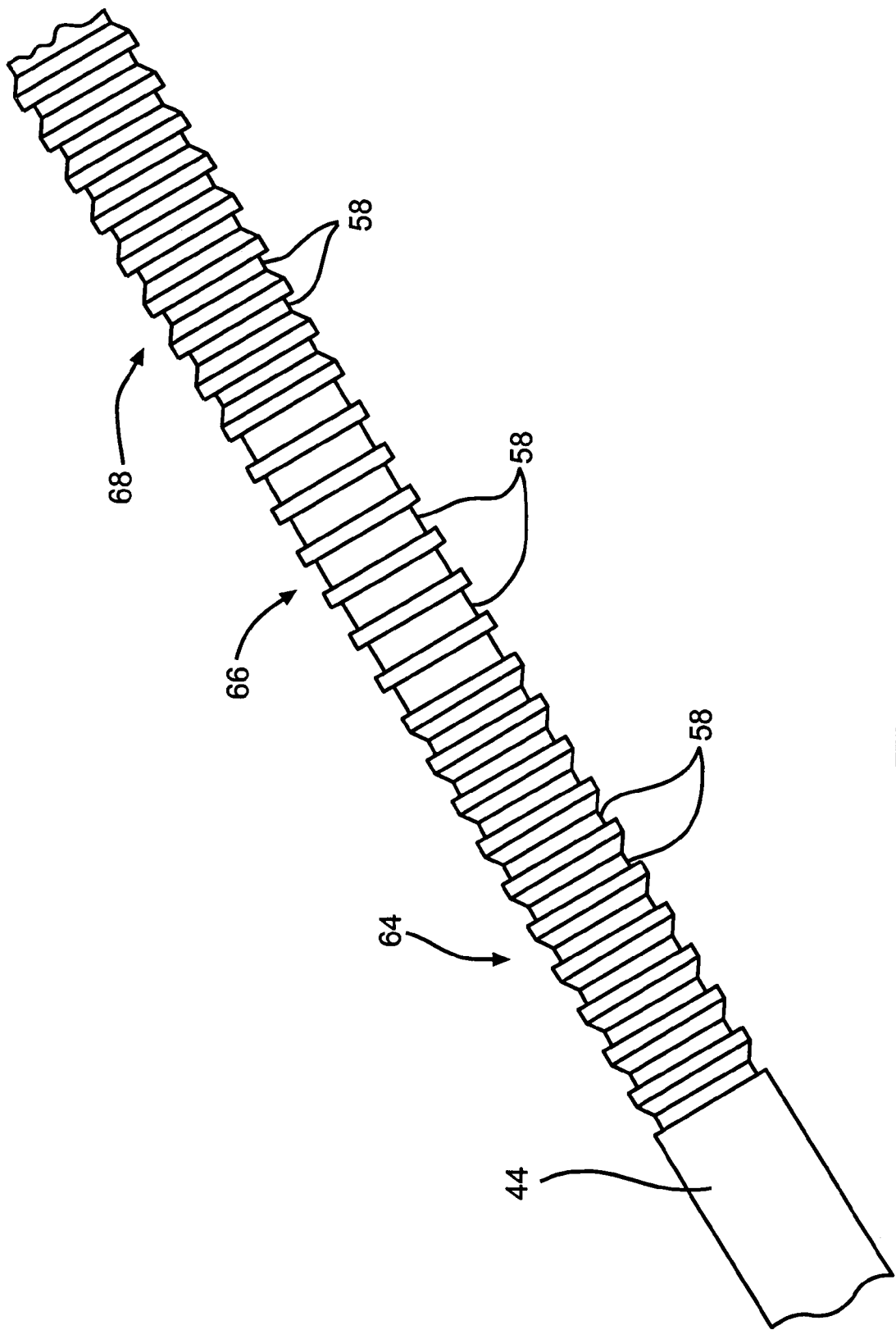
FIG. 6 is a perspective view of the input rod of the system of FIG. 1.

FIG. 6 is an enlarged view of the input rod 44. The plurality of grooves 58 formed in the exterior of the input rod 44 includes a first portion 64 of grooves 58. The first portion 64 includes grooves 58 that have one wall that extends radially outwardly and a second wall that is generally sloped toward a first end of the input rod 44. The plurality of grooves 58 includes a second portion 66 including generally vertical grooves 58. The walls of the grooves 58 in the second portion 66 both extend radially outwardly from the input rod 44. The second portion 66 is the "preferred locking position," the position where it is preferable to have the collet fingers 62 engage the input rod 44 during roll control operation. Generally, this corresponds to the position where the vehicle is in a neutral roll position, i.e. not rolling clockwise, or counterclockwise about the longitudinal axis. The plurality of grooves 58 includes a third portion 68. The third portion 68 includes grooves 58 that have one wall that extends radially outward and one wall generally sloped toward a second end (opposite the first end) of the input rod 44. Thus, preferably, the first portion 64 and the third portion 68 each include grooves 58 that have one wall that extends radially outward and one wall that sloping toward the second portion 66.

Figure 7:
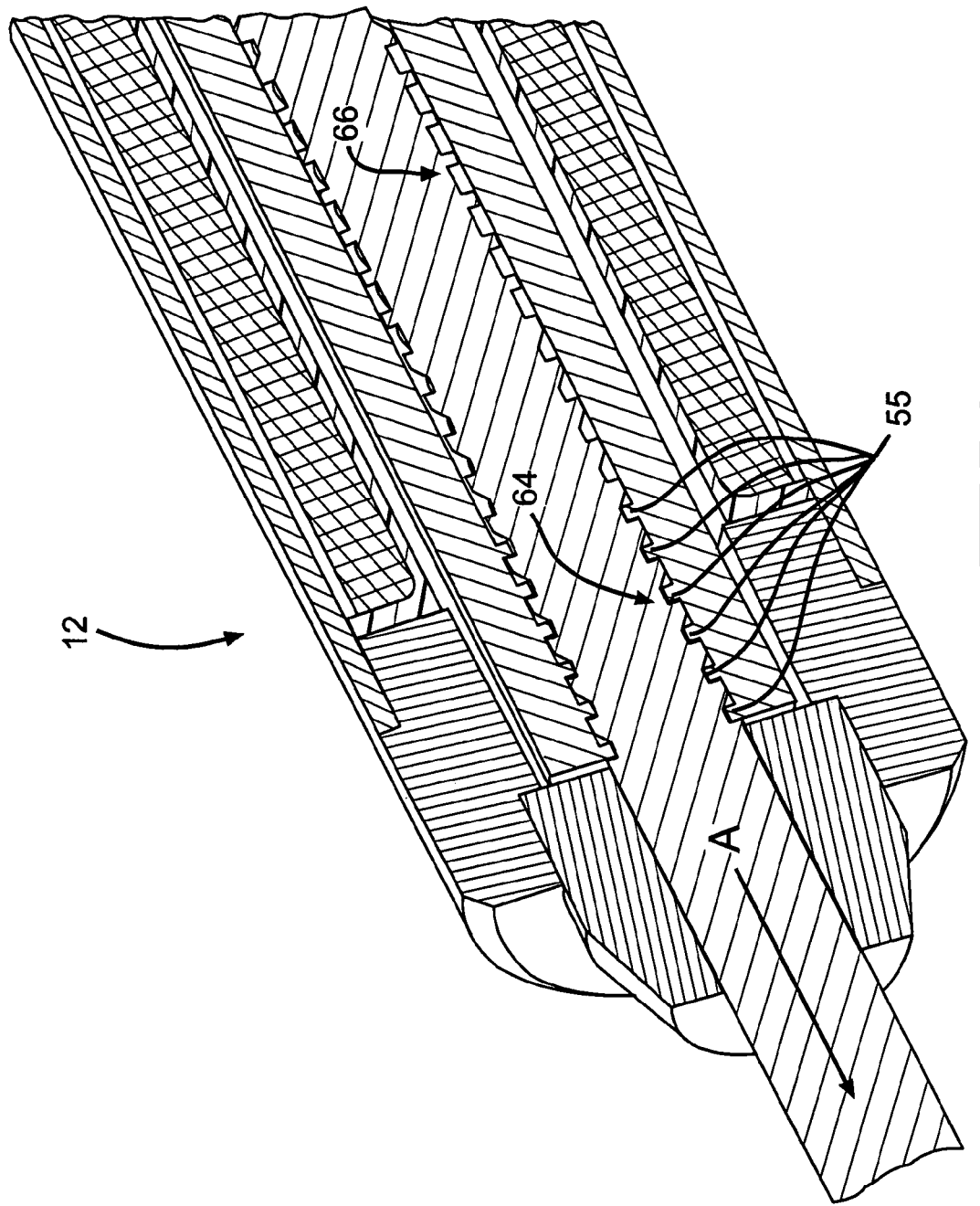
FIG. 7 is a cross-sectional perspective view of the anti-roll lock mechanism of FIG. 3 with the input rod inserted beyond the preferred locking position.

The anti-roll lock mechanism 12 is shown in FIG. 7 in the locked position with the input rod 44 inserted beyond the preferred locking position, which could exist if, for example, the mechanism is locked immediately after the associated wheel moves upward due to a bump in the road. The flanges 55 have engaged the grooves 58 at the first portion 64. The sloped grooves of the first portion 64 and the flanges 55 will ratchet toward the preferred locking position as indicated by the arrow labeled A, under conditions that will be described below. The ratcheting will continue until the flanges 55 engage the grooves at the second portion 66. The anti-roll lock mechanism 12 will remain in this preferred locking position until the mechanism 12 is unlocked.

Figure 8:
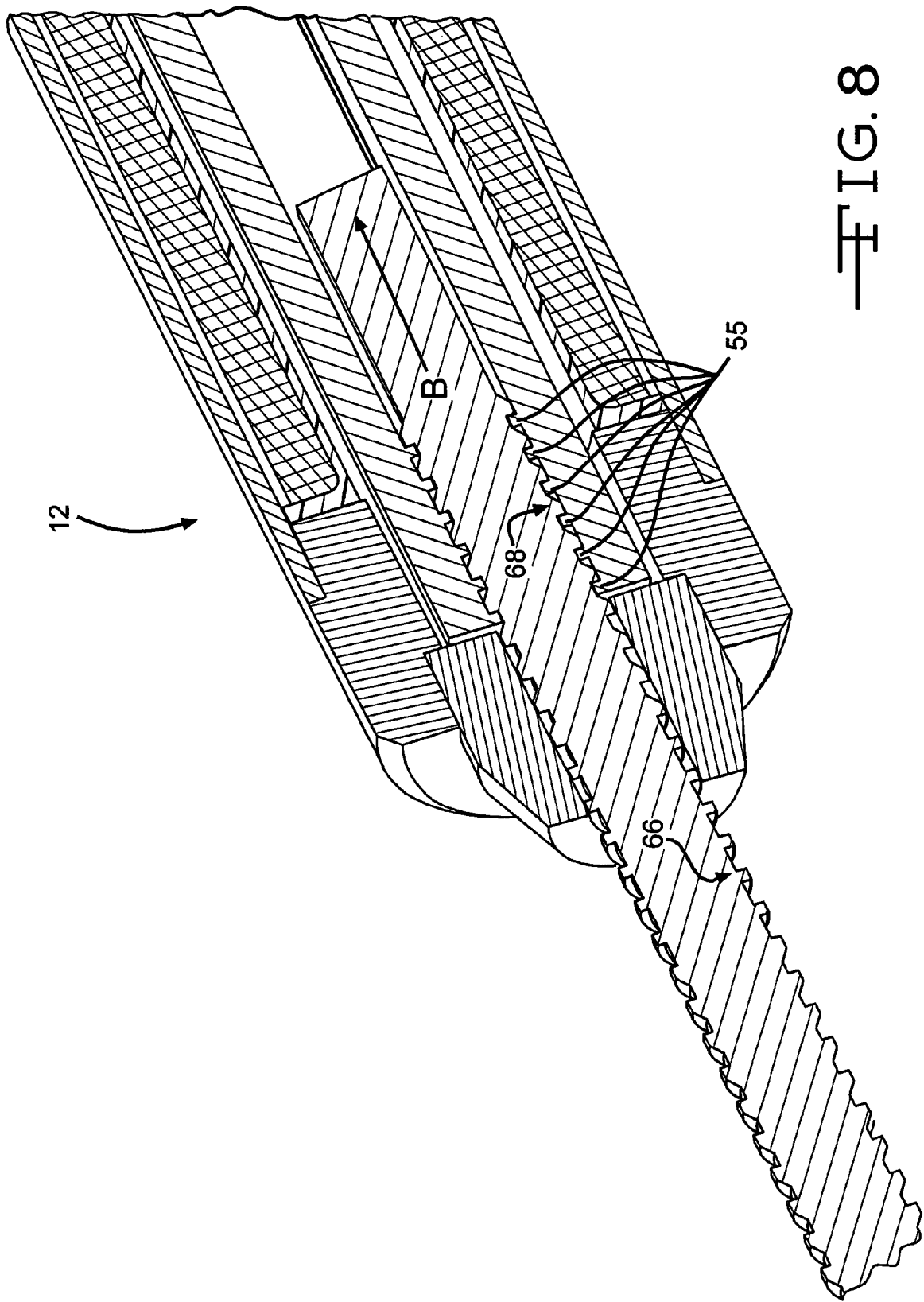
FIG. 8 is a cross-sectional perspective view of the anti-roll lock mechanism of FIG. 3 with the input rod extended beyond the preferred locking position.

The anti-roll lock mechanism 12 is shown in FIG. 8 in the locked position with the input rod 44 extended beyond the preferred locking position. The flanges 55 have engaged the grooves 58 at the third portion 66. The sloped grooves of the third portion 68 and the flanges 55 will ratchet toward the preferred locking position as indicated by the arrow labeled B. The ratcheting will continue until the flanges 55 engage the grooves at the second portion 66. The anti-roll lock mechanism 12 will remain in this preferred locking position until the mechanism 12 is unlocked by deenergizing the coil 50.

In either case, the anti-roll lock mechanism 12 will not move further away from the desired position. When the input rod 44 is "over extended," i.e. extended beyond the preferred locking position, the vehicle load will act to adjust the input rod 44 toward the desired position relative the casing 42. Conversely, when the input rod 44 is "over inserted," i.e. inserted beyond the preferred locking position, the input rod 44 adjusts toward the desired position as the vehicle passes over imperfections in the road surface, such as bumps or dips, and the action of the vehicle load is reduced. In a preferred embodiment, the adjustment of the input rod 44 continues over the sloped grooves of the first or third portions 64 or 68 until the flanges 55 engage the input rod 44 only at the second portion 66. Preferably, the anti-roll lock mechanism 12 has a high natural frequency as to slowly to move to center and be least disruptive to the vehicle occupants.

For example, an unexpected load may be imposed on one of the anti-roll lock mechanisms, such as might occur when one wheel rolls over a bump in the road. If the right front wheel 22 encounters a bump and deflects upwardly during a left hand turn, the input rod 44 is displaced upwardly in the casing 42. Even if the anti-roll lock mechanism 12 is locked at this time, as the anti-roll lock mechanism is subsequently subjected to force tending to elongate and compress the mechanism 12, due to roughness of the road, the input rod 44 will move toward the preferred locking position, for example the center position, allowing for increased performance of the roll control system 10.

Thus, the roll control system of the present invention accomplishes more than simply locking or unlocking the anti-roll bar. It should also be apparent from this description to one of ordinary skill that the present invention accommodates upward or downward deflections of any of the four wheels of the vehicle, regardless of whether the affected wheel is on the inside or outside of the turn.

Figure 9:
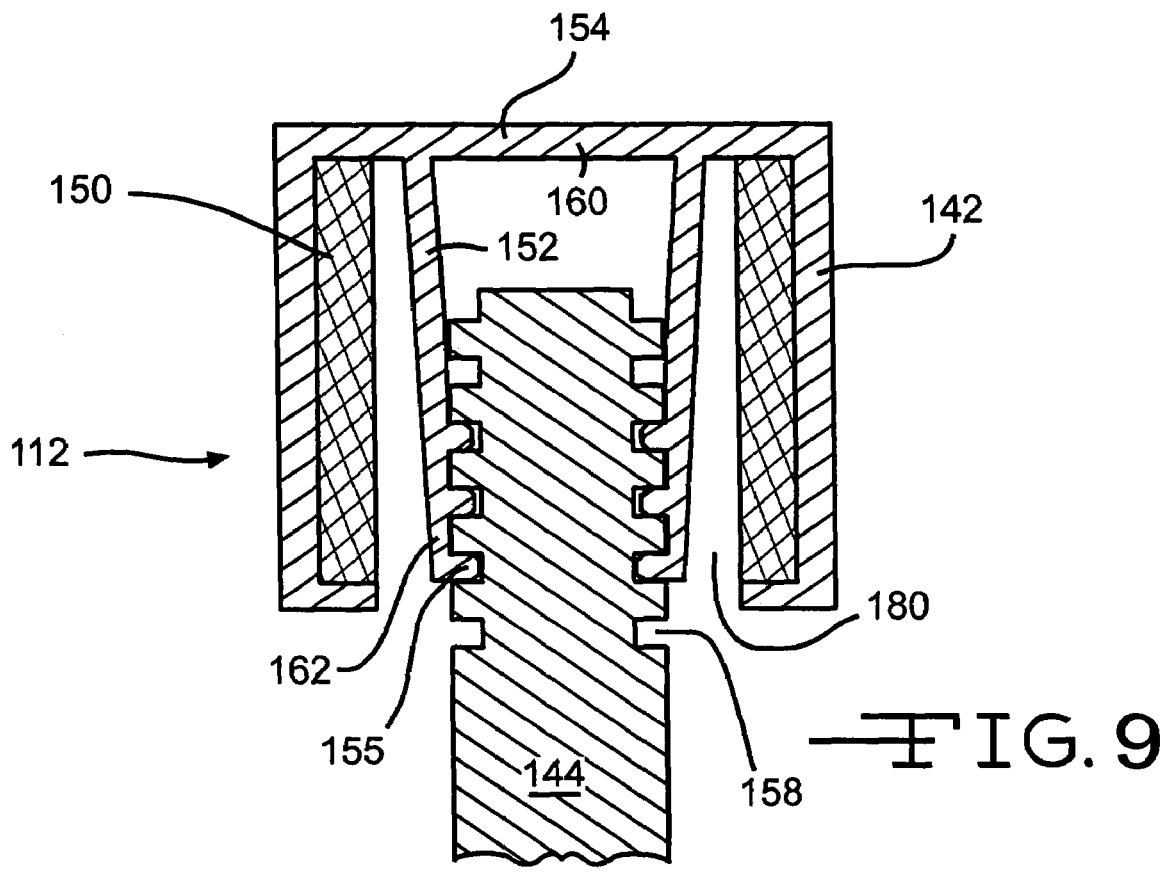
FIG. 9 is a cross-sectional view of an alternate embodiment of the anti-roll lock mechanism of the system of FIG. 1 in the locked position.

FIG. 9 illustrates an alternative anti-roll lock mechanism 112 in the locked position. A generally cylindrical casing 142 is formed integrally to an end 154 and surrounds a coil 150. A collet 152 with a base portion 160, the end 154 comprising the base portion 160, and a plurality of collet fingers 162 is disposed within the coil 150. A plurality of spaced apart ribs or flanges 155 are disposed about the interior of the collet fingers 162 at ends opposite the base portion 160. An input rod 144 is partially disposed inside the collet 152 and extends outward opposite the end 154. A plurality of threads or grooves 158 are disposed about the exterior of the input rod 144. The anti-roll lock mechanism 112 is shown in the locked state. The flanges 155 engage the grooves 158 as to lock the input rod 144 into a position relative to the collet 152. A gap 180 exists between the coil 150 and the collet fingers 162.

Figure 10:
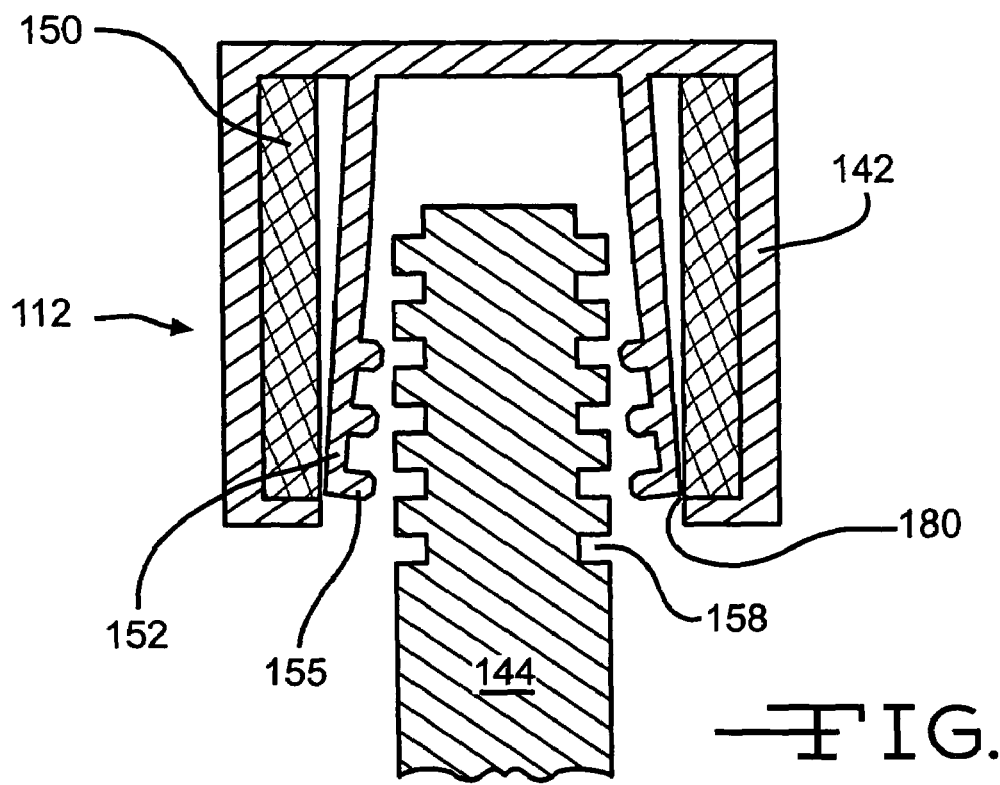
FIG. 10 is a cross-sectional view of the anti-roll lock mechanism of FIG. 9 in the unlocked position.

FIG. 10 illustrates the anti-roll lock mechanism 112 in the unlocked state. The flanges 155 are disengaged from the grooves 158 as to unlock the input rod 144 and the input rod 144 is free to move position relative to the collet 152. The coil 150 has been energized by the ECU 70 and the collet finger 162 have been drawn to the coil 150 thus closing the gap 180 and unlocking the anti-roll lock mechanism 112.

The coil 150 is energized with a large surge of electric current, producing a large magnetic pulse, sufficient to draw the collet fingers 162 to the coil 150. Thereafter, a low power magnetic field, sufficient to hold the collet fingers 162 against the coil 150, is maintained, thus allowing for low power consumption during operation of the vehicle. Preferably, this operation is an integrated sense-drive, based on a measure of voltage, as disclosed in U.S. Pat. No. 6,577,133, the disclosures of which are incorporated herein by reference. The size of the working gap, as the collet fingers 162 move, is determined by a feedback system, which in turn may indicate the proper power level for the coil 150 and the collet fingers 162 to remain engaged.

Further, it will be appreciated that this embodiment is locked unless actuated and thus the system 10 is default active. In this embodiment, the collet fingers 162 are actuated by the magnetic field generated when the coil 150 is actuated, flexing the collet fingers 162 outwardly to disengage the grooves 158 on the input rod 144. Thus, without electrical power, the lock mechanism 112 is normally locked. It is anticipated that such an arrangement may be desirable to provide for the safety of the roll control system 110 in the event of a failure. Note that the collet fingers 162 may be actuated in any suitable manner. For example, the collet fingers 162 may be positioned by hydraulic or pneumatic actuators, or by bimetallic, piezoelectric, or phase-change actuators.

Figure 11:
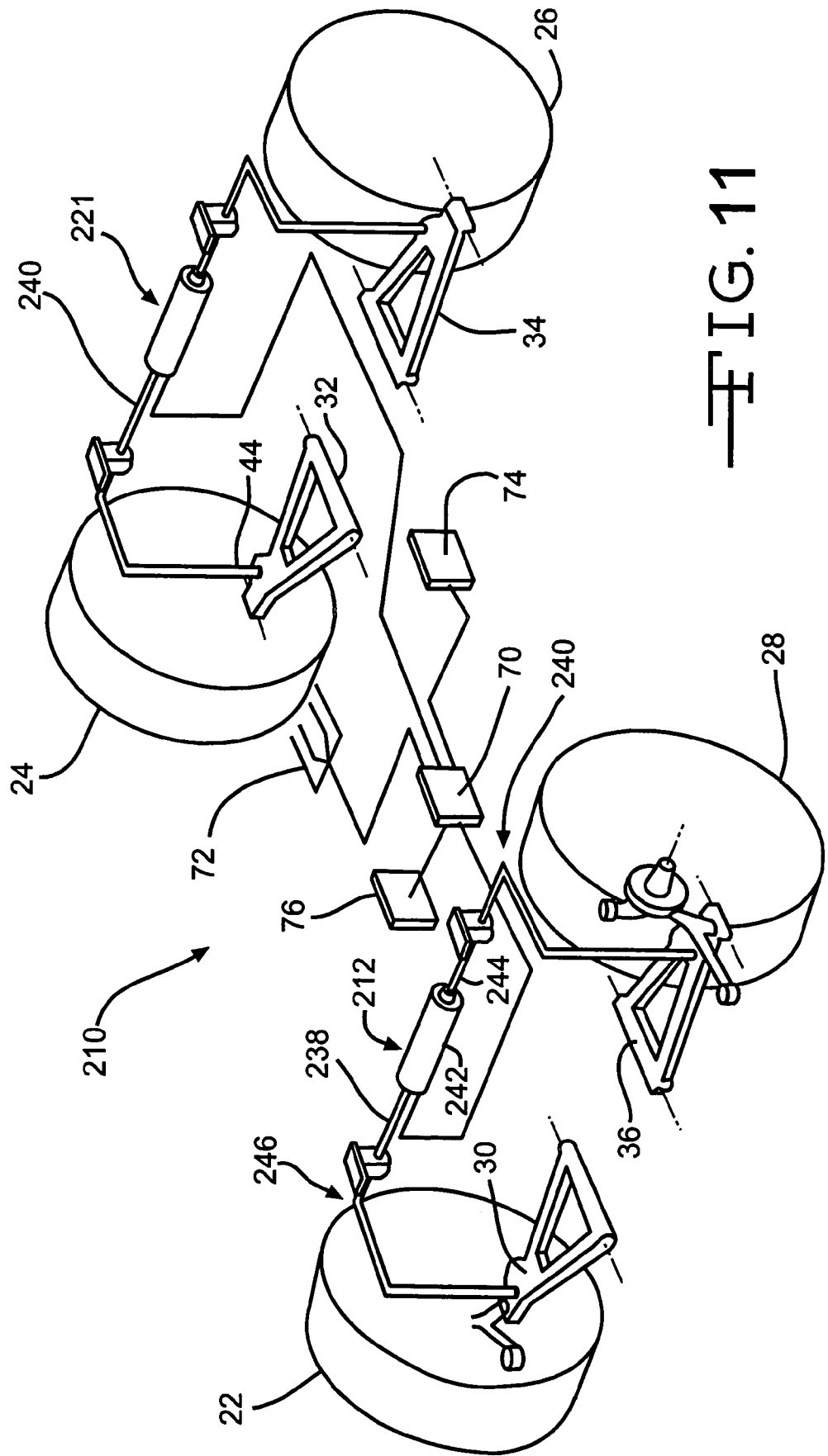
FIG. 11 is a schematic view of a alternate system according to the present invention for controlling the roll of a motor vehicle.
Figure 12:
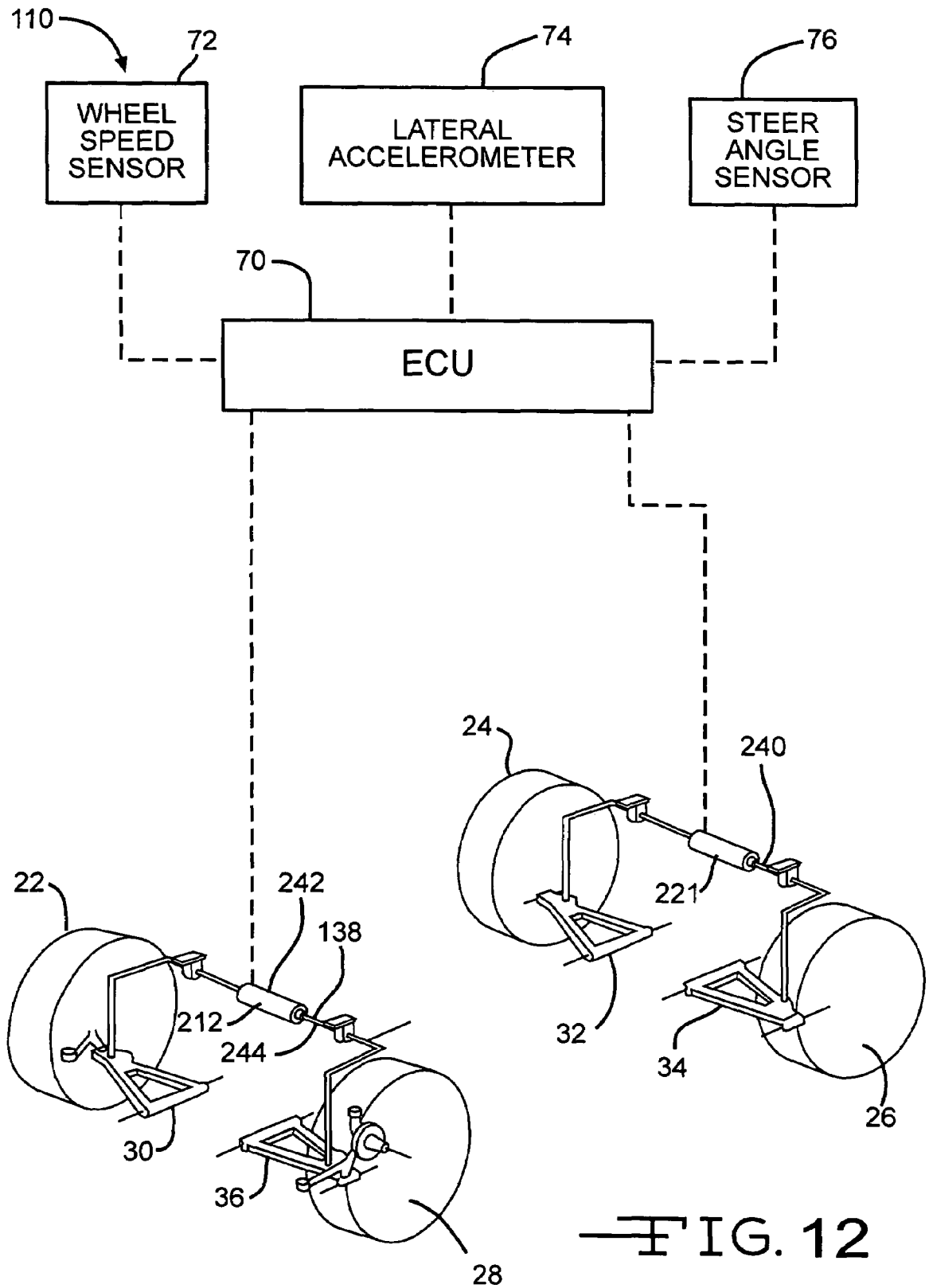
FIG. 12 is another schematic view of the roll control system shown in FIG. 11.

FIGS. 11 and 12 show a system 210 according to the present invention for controlling the roll of a motor vehicle. The system 210 comprises an anti-roll lock mechanism 212. In the embodiment shown in FIGS. 11 and 12, a second, rear anti-roll lock mechanism 221 is also provided.

Similarly to the description above, each of the wheels 22, 24, 26 and 28 of the vehicle is rotationally mounted about a substantially horizontal axis to a member such as suspension arms 30, 32, 34 and 36, respectively, which form part of an unsprung portion of the vehicle.

The following description will describe the structure and operation of the lock mechanism 212 the associated roll bar 238 and the associated suspension arms 30 and 36. Unless specifically stated otherwise the structure and operation of the lock mechanism 221, the associated roll bar 240 and the associated suspension arms 32 and 34 will be similar.

The unsprung portion of the vehicle is connected to a sprung portion of the vehicle through first and second sections 246 and 248 of an anti-roll or anti-sway bar 238. The first and second sections of the anti-roll bars 238 and 240 are connected to each other through the anti-roll lock mechanism 212. The anti-roll lock mechanisms 212 includes a casing 242 and an input rod 244 rotatably disposed in the casing.

One of the casing 242 and the input rod 244 of the anti-roll lock mechanism 212 is drivingly connected to the associated first anti-roll bar section 246. The other of the casing 242 and the input rod 244 is drivingly connected to the associated second anti-roll bar section 248. In the embodiment shown in FIGS. 11 and 12, for example, the casing 242 of the front anti-roll lock mechanism 212 is connected to one free end of the first section 246, while the portion of the input rod 244 extending generally away from the casing 242 is connected to the second section 248.

In operation, the electronic control unit (ECU) 70 processes inputs from the one or more wheel speed sensors 72, the lateral accelerometer sensor (accelerometer) 74, and the steering angle sensor 76. Based upon these inputs, the ECU 70 controls each of the anti-roll lock mechanisms 212 and 221 accordingly.

When the vehicle is traveling straight with little roll being introduced into the vehicle, the ECU 70 can unlock the anti-roll lock mechanism 212. When the anti-roll lock mechanism 212 is unlocked the input rod 244 and the casing can rotate relative to one another, thus permitting the associated first section 246 and the associated second section 248 of the anti-roll bar 238 to move freely with the suspension arm 30. This gives the vehicle a more comfortable ride when traveling relatively straight, similar to a vehicle without any anti-roll bar.

However, as discussed above, when the vehicle is not traveling straight it is generally desirable to counter the roll of the vehicle for improved comfort and performance. The motor vehicle may begin a relatively high speed left hand turn, which in absence of compensation by the system 210 would cause the unsprung portion of the vehicle to tend to roll generally clockwise about it longitudinal axis, helping urge the occupants of the vehicle to the outside of the turn (sliding downhill).

At the beginning of such a maneuver, the sensors 72, 74 and 76 of the present invention signal the instantaneous conditions to the ECU 70. The ECU 70 in turn locks each of the anti-roll lock mechanisms 212 and 221. This permits the anti-roll bars 238 and 240 to act to counteract the roll of the vehicle in a manner similar to conventional anti-roll bars.

To counteract anticipated vehicle roll in the opposite direction, for example as might be experienced during a right hand turn, the ECU 70 repeats this procedure and locks each of the anti-roll lock mechanisms 212 and 221. In either case, as the sensors 72, 74 and 76 indicate an instantaneous or anticipated reduction or increase in the need for stability to deter vehicle roll, the ECU locks, unlock or maintains the state of each of the anti-roll lock mechanisms 12 and 21 as appropriate.

Figure 13:
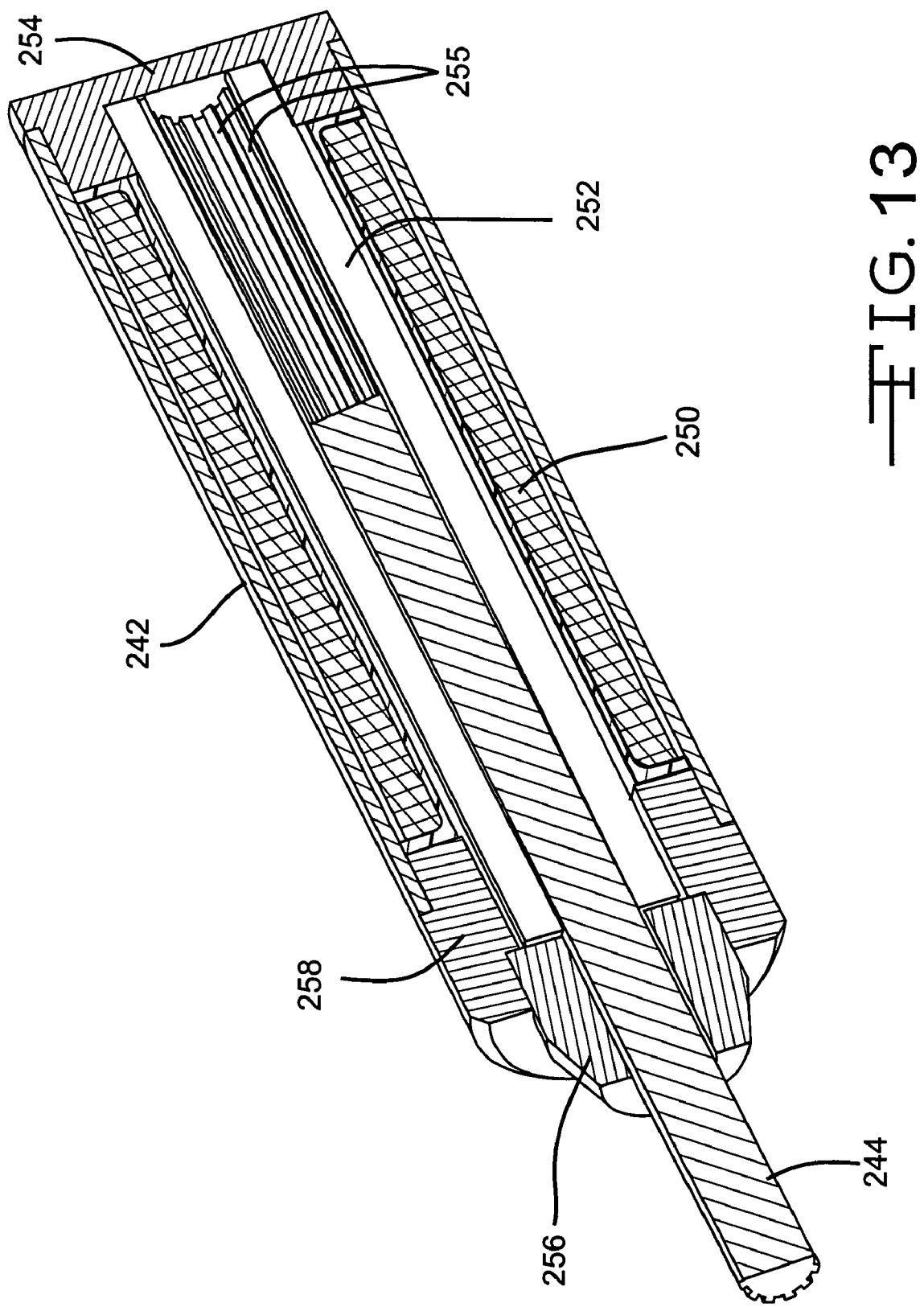
FIG. 13 is a cross-sectional perspective view of the anti-roll lock mechanism of the system of FIG. 11.

FIG. 13 best illustrate the anti-roll lock mechanism 212 of the system of FIGS. 11 and 12. The generally cylindrical casing 242 surrounds a coil 250. A collet 252, which will be described below, is disposed within the coil 250 and is anchored to the casing 242 by a closed end cap 254. A rod guide 256 is anchored to the casing 242 by an open end cap 258 opposite the closed end cap 254. The input rod 244 is partially disposed inside the collet 252 and extends through the rod guide 256.

The anti-roll lock mechanism 212 is shown in the locked state. Longitudinally extending collet splines 255 engage a plurality of longitudinally extending threads or grooves 258 (not shown) disposed about the exterior of the input rod 244, as will be described below, as to lock the input rod into a position relative to the collet 252.

Figure 14:
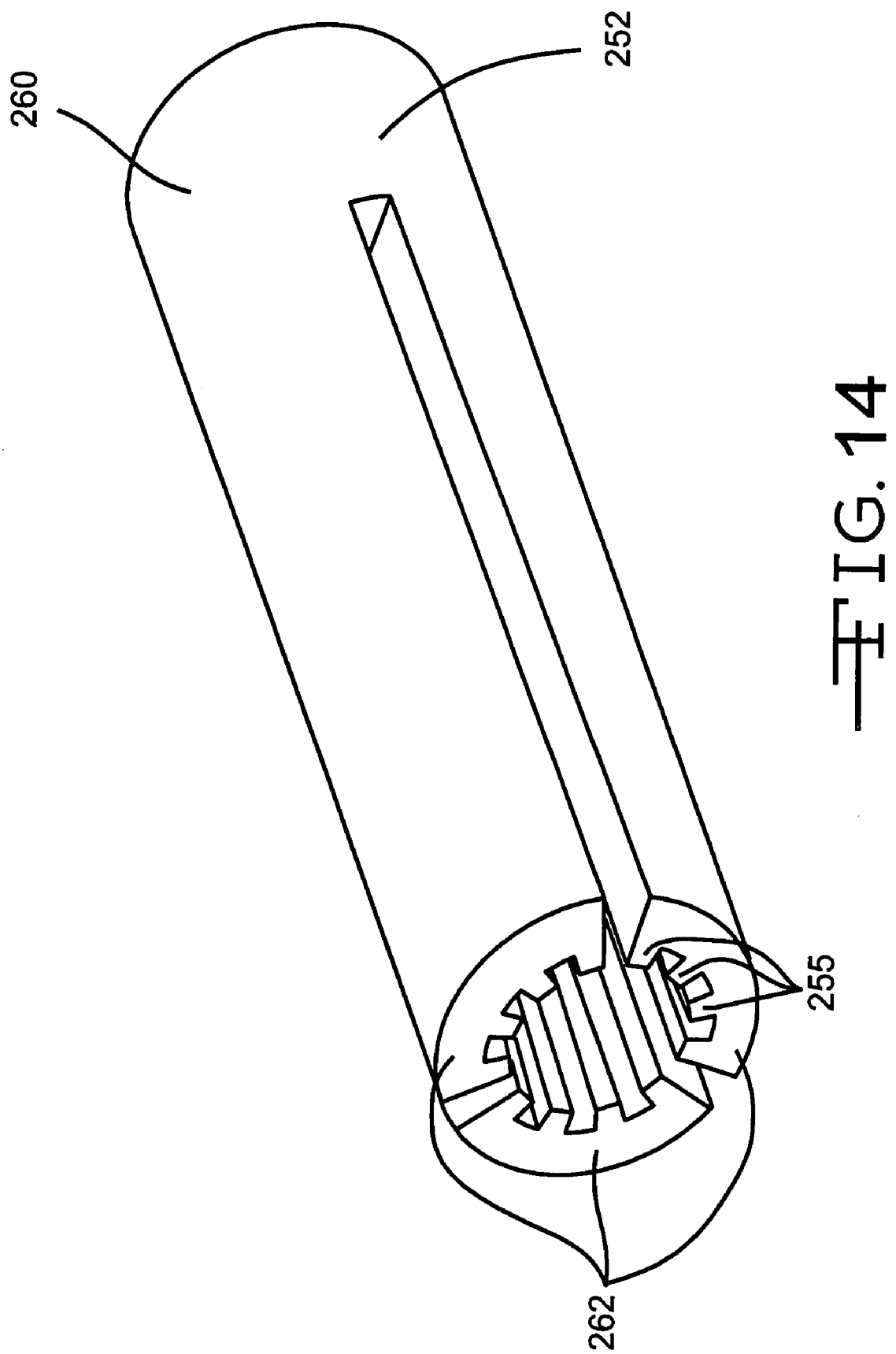
FIG. 14 is a perspective view of the collet of the of the anti-roll lock mechanism of FIG. 13.

FIG. 14 best illustrates the collet 252. The collet 252 includes a hollow cylindrical base portion 260 and a plurality of collet fingers 262. The collet fingers 262 extend longitudinally from circumferentially spaced apart locations of the base portion 260. The collet splines 255 are formed on the interior surface of each of the collet fingers 262 of the collet 252 running axially with the collet fingers 262.

Figure 15:
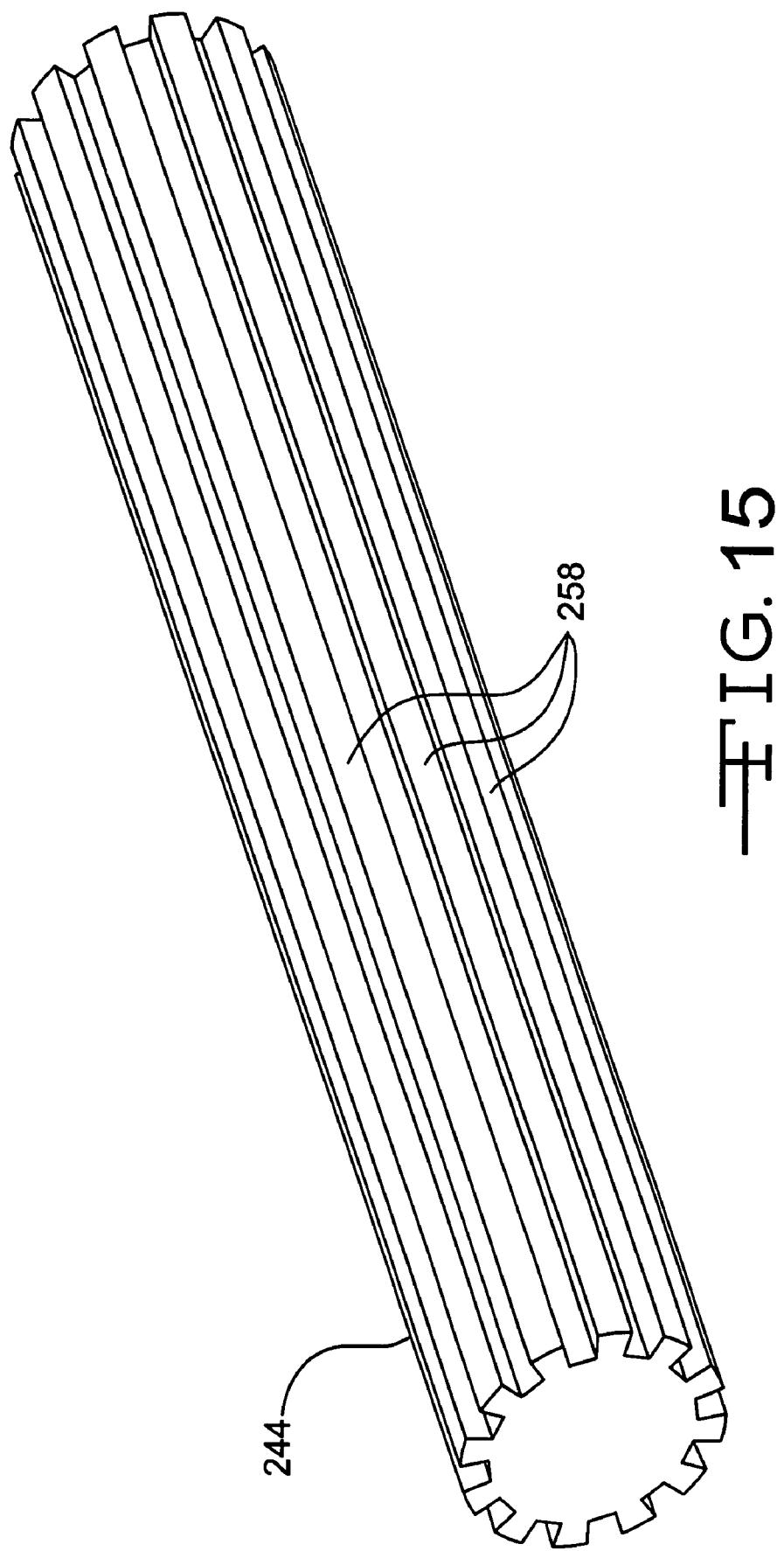
FIG. 15 is a perspective view of the input rod of the system of FIG. 11.

FIG. 15 best illustrates the input rod 244. The plurality of grooves 258 are disposed about the exterior of the input rod 244.

Figure 16:
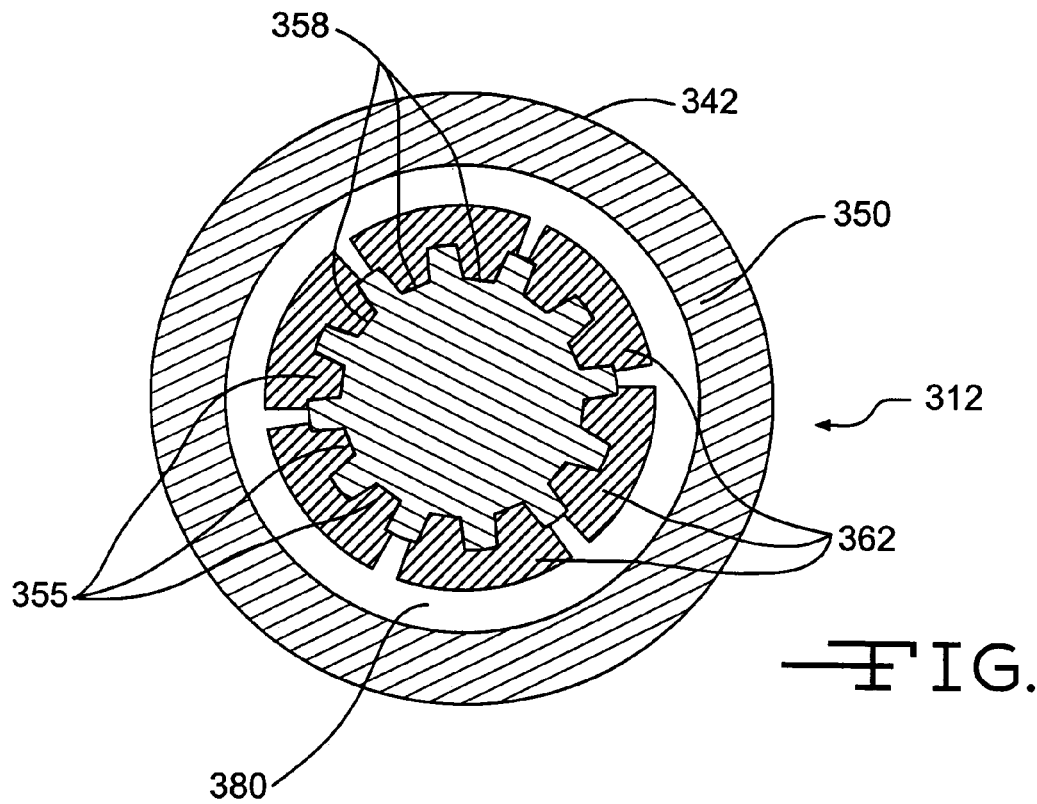
FIG. 16 is a cross-sectional view of an alternate embodiment of the anti-roll lock mechanism of the system of FIG. 11 in the locked position.

FIG. 16 illustrates an alternative anti-roll lock mechanism 312 in the locked position. A generally cylindrical casing 342 surrounds a coil 350. A plurality of collet fingers 362 is disposed within the coil 350. A plurality of spaced apart collet splines 355 are disposed about the interior of the collet fingers 362. An input rod 344 is partially disposed inside the collet 352. A plurality of threads or grooves 358 are disposed about the exterior of the input rod 344. The anti-roll lock mechanism 312 is shown in the locked state. The splines 355 engage the grooves 358 as to lock the input rod 344 into a position relative to the collet 352. At a position 380 between the coil 150 and the collet fingers 362 there exists a gap.

Figure 17:
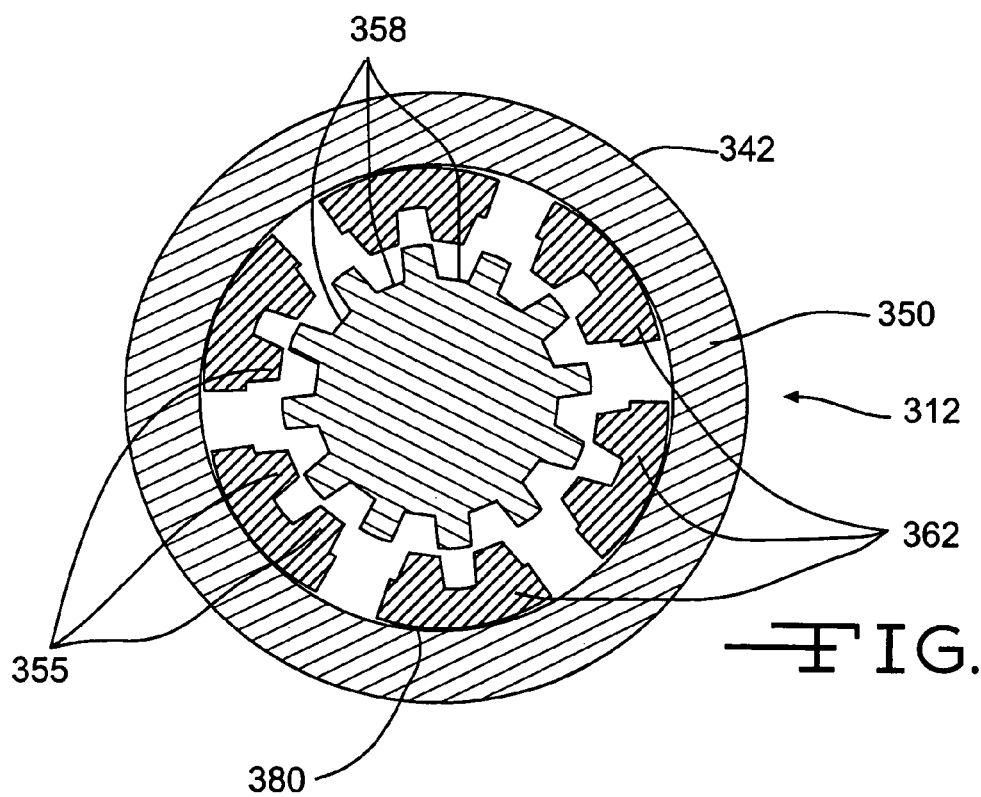
FIG. 17 is a cross-sectional view of the anti-roll lock mechanism of FIG. 16 in the unlocked position.

FIG. 17 illustrates the anti-roll lock mechanism 312 in the unlocked state. The splines 355 are disengaged from the grooves 358 as to unlock the input rod 344 and the input rod 344 is free to rotate position relative to the collet 352. The coil 350 has been energized by the ECU 70 and the collet fingers 362 have been drawn to the coil 350 thus closing the gap at 380 and unlocking the anti-roll lock mechanism 312.

Figure 18:
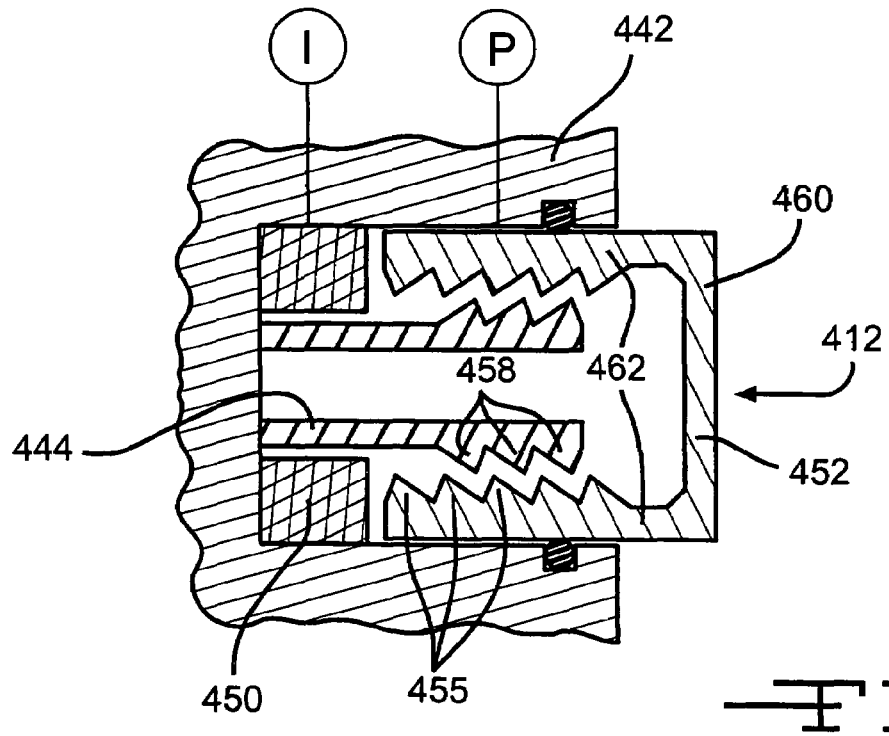
FIG. 18 is a schematic view of another alternate embodiment of the anti-roll lock mechanism of the present invention.

FIG. 18 illustrates an alternative anti-roll lock mechanism 412 in the unlocked position. A casing 442 is, at least partially, surrounds a coil 450 and a collet 452 with a base portion 460. The collet 452 has plurality of collet fingers 462. A plurality of spaced steps 455 are disposed about the interior of the collet fingers 462 at ends opposite the base portion 460. An input rod 444 is partially disposed inside the collet 452 and extends outward opposite the end 460. A plurality of steps 458 are disposed about the exterior of the input rod 444. The anti-roll lock mechanism 412 is shown in the unlocked state. In the locked state, under pressure, the steps 455 engage the steps 458, and the input rod 444 is locked in position relative the collet 452. The coil 450 is energized and locks the collet 452, and in turn the input rod 444, into a position relative to the casing 442.

Figure 19:
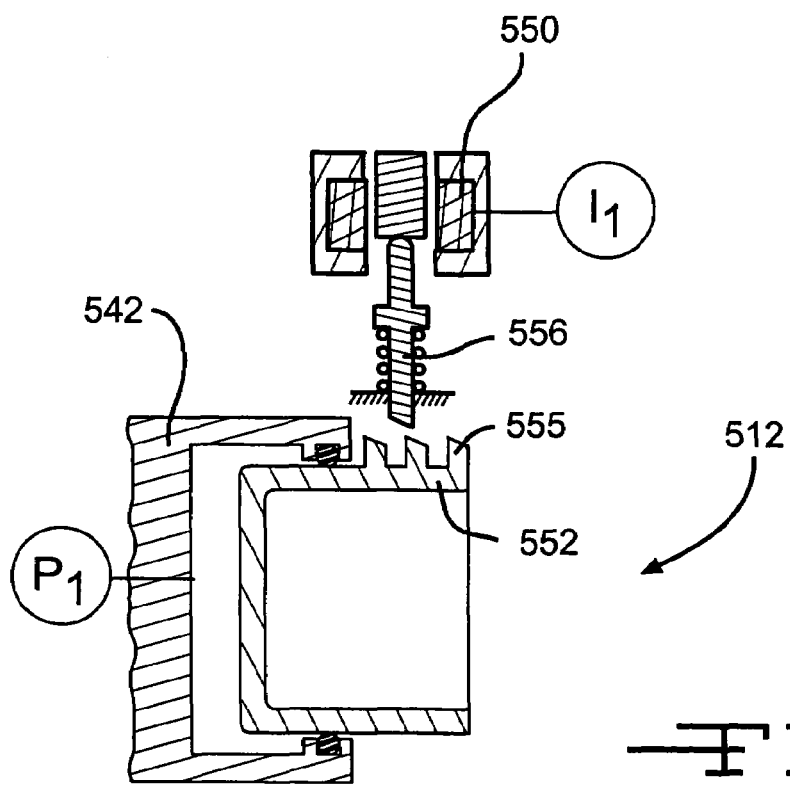
FIG. 19 is a schematic view of a further alternate embodiment of the anti-roll lock mechanism of the present invention.

FIG. 19 illustrates a further alternative anti-roll lock mechanism 512 in the unlocked state. A pin 556 is disengaged from a plurality of flanges 555 as to unlock a collet 552 and allow the collet 552 to freely move position relative to a casing 542. In the unlocked position, a coil 550 has been energized by the ECU 70 to retain the pin 556 against the coil 550.

Although the above embodiments have been described as having all roll control being inactive (disengaged—fail free) or as having all roll control being active (engaged fail stiff) upon a failed state, it will be appreciated that the invention may be practiced otherwise. For example, one alternate embodiment includes a fail free rear and a fail stiff front, thus in failure the vehicle would under steer or plow out. For example, the actuator 21 would be inactive upon a failed state and the actuator 12 would be active upon a failed state. Further, another alternate embodiment includes a fail free front and a fail stiff rear, thus in failure the vehicle would over steer (have the rear of the vehicle swing out). For example, the actuator 12 would be inactive upon a failed state and the actuator 21 would be active upon a failed state.

Although the above embodiments have been described as including a collet engagement mechanism that may generally be described as electromagnetic, it must be understood, however, that the invention may includes any suitable collet engagement mechanism, for example, an electrorheologic mechanism or a magnetorheologic mechanism.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electrically operated actuator for controlling the roll of a motor vehicle, wherein the actuator is connected between an unsprung portion of the vehicle and a sprung portion of the vehicle for selectively coupling the sprung portion of the vehicle to the unsprung portion of the vehicle, the actuator comprising;
   a collet finger operatively connected to one of the sprung portion of the vehicle and the unsprung portion of the vehicle;
   a grooved input rod operatively connected to the other of the sprung portion of the vehicle and the unsprung portion of the vehicle; and
   a collet engagement mechanism for selectively moving said collet finger into and out of engagement with the grooves of said input rod.

2. The actuator of claim 1 wherein a casing is fixed to said one of the sprung portion of the vehicle and the unsprung portion of the vehicle, and wherein said collet finger is fixed to said casing.

3. The actuator of claim 1 wherein said collet engagement mechanism comprises an electrical coil.

4. The actuator of claim 1 wherein said grooves of said input rod include a portion of sloped grooves.

5. The actuator of claim 4 wherein said portion of sloped grooves are sloped toward a preferred locking position on said input rod.

6. The actuator of claim 1 wherein, when said collet finger is in engagement with the grooves of said input rod, the actuator only allows movement of said input rod toward a preferred locking position of said input rod.

7. The actuator of claim 1 wherein said collet finger and said input rod are formed such that when the actuator is urging said collet finger into engagement with said input rod, said input rod is only allowed movement toward a preferred locking position relative said collet finger.

8. The actuator of claim 1 wherein, when the collet finger is in engagement with the grooves of said input rod, the actuator allows movement of said collet only toward a preferred locking position of said input rod.

9. The actuator of claim 8 wherein said input rod comprises a first portion of rod including a first portion of said grooves and a second portion of rod including a second portion of said grooves, said second portion of rod having said second portion of said grooves formed therein with radially extending walls, said second portion of rod defining said preferred locking position, said first portion of rod provided with said first portion of grooves, each groove of said first portion of grooves having one radially outwardly extending wall and one wall sloping toward said second portion of rod to permit camming action movement of said collet finger therealong said input rod toward said preferred locking position.

10. The actuator of claim 9 wherein said input rod further comprises a third portion, said third portion provided with said grooves, each groove having one radially outwardly extending wall and one wall sloping toward said second portion to permit movement of said collet finger therealong camming action toward said preferred locking position.

11. The actuator of claim 10 wherein said second portion is intermediate said first and third portions.

12. A system for controlling the roll of a motor vehicle, the system including first and second electrically operated actuators, wherein the first actuator is connected at the front of the vehicle between an unsprung portion of the vehicle and a sprung portion of the vehicle for selectively coupling the sprung portion of the vehicle to the unsprung portion of the vehicle, and wherein the second actuator is connected at the rear of the vehicle between the unsprung portion of the vehicle and the sprung portion of the vehicle for selectively coupling the sprung portion of the vehicle to the unsprung portion of the vehicle, each actuator comprising;
   a collet finger mounted to one of the sprung portion of the vehicle and the unsprung portion of the vehicle;
   a grooved input rod mounted to the other of the sprung portion of the vehicle and the unsprung portion of the vehicle; and
   a collet engagement mechanism for selectively moving said collet finger into and out of engagement with the grooves of said input rod.

13. The system of claim 12 wherein a casing is fixed to said one of the sprung portion of the vehicle and the unsprung portion of the vehicle, and wherein said collet finger is fixed to said casing.

14. The system of claim 12 wherein said collet engagement mechanism comprises an electrical coil.

15. The system of claim 12 wherein said grooves of said input rod include a portion of sloped grooves.

16. The system of claim 15 wherein said portion of sloped grooves are sloped toward a preferred locking position on said input rod.

17. The system of claim 12 wherein, when said collet finger is in engagement with the grooves of said input rod, each actuator only allows movement of said input rod toward a preferred locking position of said input rod.

18. The system of claim 12 wherein said collet finger and said input rod are formed such that when the actuator is urging said collet finger into engagement with said input rod, said input rod is only allowed movement a preferred locking position relative said collet finger.

19. The system of claim 12 wherein each actuator allows movement only toward a preferred locking position when the collet finger is in engagement with the grooves of the input rod.

20. A roll control actuator for controlling the roll of a vehicle that can be locked or unlocked based upon a lock signal, the actuator being at least one of configured and controlled such that when the lock signal is present the actuator can move only toward a center of travel of the actuator, the actuator adapted to be mounted between a sprung and an unsprung portion of the vehicle.

21. The roll control actuator according to claim 20, the actuator comprising a selective locking mechanism that prevents movement of the actuator away from the center of travel position when locked, and permits free travel relative to a preferred locking position when unlocked, the locking mechanism comprising at least one of an electro-magnetic mechanism, an electro-rheologic mechanism, a magneto-rheologic mechanism, and a mechanical interlocking mechanism.

22. The roll control actuator according to claim 21 wherein the mechanical interlocking mechanism comprises a body with a grooved surface and a collet finger cooperating with said grooved surface to selectively lock the actuator.

* * * * *